United States Patent
Zhou et al.

(10) Patent No.: US 9,011,722 B2
(45) Date of Patent: Apr. 21, 2015

(54) HALO-BORATE LUMINESCENT MATERIALS AND PREPARATION METHODS THEREOF

(75) Inventors: Mingjie Zhou, Guangdong (CN); Qiurong Liao, Guangdong (CN); Wenbo Ma, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 147 days.

(21) Appl. No.: 13/885,275

(22) PCT Filed: Dec. 14, 2010

(86) PCT No.: PCT/CN2010/079746
§ 371 (c)(1),
(2), (4) Date: May 14, 2013

(87) PCT Pub. No.: WO2012/079218
PCT Pub. Date: Jun. 21, 2012

(65) Prior Publication Data
US 2013/0240785 A1    Sep. 19, 2013

(51) Int. Cl.
*C09K 11/61* (2006.01)
*C09K 11/87* (2006.01)
*C09K 11/77* (2006.01)

(52) U.S. Cl.
CPC ............... *C09K 11/87* (2013.01); *C09K 11/774* (2013.01)

(58) Field of Classification Search
CPC ............ C09K 11/0827; C09K 11/616; C09K 11/634; C09K 11/774; C09K 11/7705; C09K 11/7712; C09K 11/87
USPC ........ 252/301.4 H, 301.4 F, 301.6 F, 301.4 R; 264/21
See application file for complete search history.

(56) References Cited

U.S. PATENT DOCUMENTS

2008/0283857 A1*  11/2008  Chen et al. ................ 257/98

OTHER PUBLICATIONS

Xiao et al. "Ca2BO3Cl:Ce3+,Eu2+: A potential tunable yellow-white-blue-emitting phosphors for white light-emitting diodes", 2009, Physica B, 404, pp. 3743-3747.*

* cited by examiner

*Primary Examiner* — C Melissa Koslow
*Assistant Examiner* — Lynne Edmondson
(74) *Attorney, Agent, or Firm* — Rosenberg, Klein & Lee

(57) ABSTRACT

Halo-borate luminescent materials and preparation methods thereof are provided. The said luminescent materials are represented by the following general formula: $Ca_{2-x}BO_3Cl_{1-y}F_y:xEu^{2+}$, with $zM^0$, wherein $M^0$ is selected from one of Ag, Au, Pt, Pd or Cu metal nano-particles; $0.001 \leq x \leq 0.1$, $0 \leq y \leq 0.2$, $0 < z \leq 0.01$. The said luminescent materials have excellent chemical stability and high luminous intensity. The said preparation methods have simple technique, no pollution, manageable process conditions and low equipment requirement, and are beneficial to industry production.

10 Claims, 2 Drawing Sheets

HALO-BORATE LUMINESCENT MATERIALS AND PREPARATION METHODS THEREOF

FIELD OF THE INVENTION

The present disclosure relates to luminescent materials, and more particularly relates to a halogen borate phosphor for white LED. The present disclosure further relates to a preparation method of the halogen borate phosphor.

BACKGROUND OF THE INVENTION

White LED (Light Emitting Diode) has some advantages such as small power consumption, long usage life, environment protection and so on. With the improvement of the luminous efficiency and lowering of the production costs, the white LED is expected to become a new generation of lighting source following the incandescent, the fluorescent lamps, and the high-strength gas discharge lamp. The replacement of white LED solid-state light sources to traditional vacuum light is a breakthrough technology innovation as the replacement of the transistors to the traditional vacuum tube, which may lead to a revolution of the lighting field.

Nowadays, the most commonly method to implement white LED is to combine blue LED chip and blu-ray effectively stimulated yellow phosphor. YAG type phosphors is the most mature yellow phosphor, which is an yttrium aluminum garnet ($Y_3Al_5O_{12}$:Ce) activated by trivalent cerium ions and can be combined with blue LED chip to form the white LED. Although a relative high luminous efficiency may be achieved, white LED with warm white and high color rendering properties is hardly obtained, due to the lack of red in its emission wavelength. Besides, during the preparation of the YAG type phosphor, a high temperature requires, thus increasing the cost and lowing the luminous intensity. However, as for the non-YAG type phosphor, the biggest problem is the low luminous efficiency.

SUMMARY OF THE INVENTION

In order to solve the above problems, a halogen borate phosphor with lower cost and higher luminous efficiency is provided, which is represented by the following general formula: $Ca_{2-x}BO_3Cl_{1-y}F_y$:$xEu^{2+}$, with $zM^0$; wherein $M^0$ represents metal nano-particles selected from the group consisting of Ag, Au, Pt, Pd and Cu; $0.001 \leq x \leq 0.1$, $0 \leq y \leq 0.2$, $0 < z \leq 0.01$, preferably $1 \times 10^{-4} \leq z \leq 1 \times 10^{-3}$.

In another aspect of the present invention, a method of preparing the halogen borate phosphor is also provided including the following steps:

Step S1, calcium source compound, boron source compound, chlorine source compound, fluorine source compound, and europium source compound are weighed and dissolved in water according to a composition of a formula of $Ca_{2-x}BO_3Cl_{1-y}F_y$:$xEu^{2+}$, with $zM^0$ to prepare a mixed solution, wherein $0.001 \leq x \leq 0.1$, $0 \leq y \leq 0.2$.

Step S2, chelating agent and crosslinking agent are added successively to the mixed solution obtained in the step S2 to prepare a chelate solution.

Step S3, a surface-treated nano-particle sol of $M^0$ is added to the chelate solution prepared in step S2, the system is stirred and heated in a water bath, dried to obtain a precursor, wherein $M^0$ represents metal nano-particles selected from the group consisting of Ag, Au, Pt, Pd and Cu.

Step S4, the precursor obtained in step S3 is pre-sintered, cooled, grinded, and then calcined in a reducing atmosphere, cooled, grinded again to obtain the halogen borate phosphor represented by the following general formula: $Ca_{2-x}BO_3Cl_{1-y}F_y$:$xEu^{2+}$, with $zM^0$.

In step S1 of the method, the calcium source compound is calcium nitrate, calcium chloride, or calcium fluoride; the boron source compound is boric acid or tributyl borate; the chlorine source compound is calcium chloride or ammonium chloride; the fluorine source compound is calcium fluoride or ammonium fluoride; the europium source compound is europium nitrate, europium chloride, fluoride, or europium.

In step S2 of the method, the chelating agent is citric acid, and a molar ratio of the chelating agent to the total metal ions (including Ca ion and Eu ion) in the mixed solution is 1:1 to 3:1; the crosslinking agent is polyethylene glycol with a molecular weight of 10,000, and a molar ratio of the crosslinking agent to the total metal ions in the mixed solution is 0.5% to 1%.

In step S3 of the method, the surface-treated nano-particle sol is prepared according to the following steps:

Step S31, an $M^0$ source compound is weighed and dissolved in water to prepare and dilute a solution with a molar concentration of $M^0$ ion of $1 \times 10^{-4}$ mol/L to $1 \times 10^{-2}$ mol/L; wherein $M^0$ represents metal nano-particles selected from the group consisting of Ag, Au, Pt, Pd and Cu.

Step S32, an additive and a reducing agent solution are added successively to the solution prepared in step S31, stirring and obtaining an $M^0$ nanoparticles sol.

Step S33, a surface treatment agent is added to the $M^0$ nanoparticles sol obtained in step S32, stirring to obtain the surface-treated $M^0$ nanoparticles sol.

In step S3 of the method, the amount of the surface-treated nano-particle sol of $M^0$ is 0 to 0.01 time of the amount of phosphor (calculated according to the z value of the general formula: $Ca_{2-x}BO_3Cl_{1-y}F_y$:$xEu^{2+}$, with $zM^0$). The process of stirring and heating in a water bath includes: stirring and heating in a 70° C. to 90° C. water bath for 2 hours to 6 hours; a temperature of the drying process is 80° C. to 150° C.

In step S4 of the method, the process of pre-sintering includes: pre-sintering at a temperature of 500° C. to 800° C. for 2 hours to 7 hours; the process of calcining comprises: calcining the precursor at a temperature of 800° C. to 1200° C. for 2 hours to 6 hours.

Compare to the prior art, the halogen borate phosphor prepared by the present invention have a strong absorption in the range of 400 to 500 nm, thus it is very suitable for the excitation of a blue LED chip, and it can be applied to white light LED. In addition, since metal nanoparticles are doped in the luminescent material, the luminous intensity of the luminescent material is increased by the surface plasmon resonance generated by the surface of the metal particles. Furthermore, the preparation process of the present invention is easy to operate, low synthesis temperature, low cost, and is advantageous for industrial production, and it can be widely used in the field of preparation of the luminescent material

DETAILED DESCRIPTION

A halogen borate phosphor represented by the following general formula: $Ca_{2-x}BO_3Cl_{1-y}F_y:xEu^{2+}$, with $zM^0$ is provided, wherein $M^0$ represents metal nano-particles selected from the group consisting of Ag, Au, Pt, Pd and Cu; $0.001 \le x \le 0.1$, $0 \le y \le 0.2$, $0 < z \le 0.01$, preferably, $1\times10^{-4} \le z \le 1\times10^{-3}$.

A method of preparing the halogen borate phosphor is also provided. Before the preparation of the halogen borate phosphor, a surface-treated nano-particle sol for doping is prepared according to the following steps:

1) An $M^0$ source compound is weighed and dissolved in water to prepare and dilute a solution with a molar concentration of $M^0$ ion of $1\times10^{-4}$ mol/L to $1\times10^{-2}$ mol/L; wherein $M^0$ represents metal nano-particles selected from the group consisting of Ag, Au, Pt, Pd and Cu; the $M^0$ source compound is selected from the group consisting of silver nitrate, chloroauric acid, chloroplatinic acid, and palladium chloride.

2) An additive is added to the solution prepared in step 1), and the concentration of the additive in an $M^0$ nanoparticles sol is from $1.5\times10^{-4}$ g/mL to $2.1\times10^{-3}$ g/mL; wherein the additive is at least one selected from the group consisting of polyvinylpyrrolidone (PVP), sodium citrate, cetyl trimethyl ammonium bromide, sodium lauryl sulfate, and sodium dodecyl sulfate.

3) A reducing agent is dissolved in water to prepare a reducing agent solution with a molar concentration from $1\times10^{-3}$ mol/L to $1\times10^{-2}$ mol/L; wherein the reducing agent in the reducing agent solution is at least one selected from the group consisting of hydrazine, ascorbic acid, and sodium borohydride.

4) The reducing agent solution prepared in step 3) is added to the $M^0$ nanoparticles solution with additive prepared in step 2) according to a molar ratio of the reducing agent and the $M^0$ ion of 1.2:1 to 4.8:1 under a state of the magnetic stirring, and the system is reacted for 10 min to 45 min to obtain an $M^0$ nanoparticles sol.

5) A surface treatment agent, such as polyvinylpyrrolidone (PVP), is added to the $M^0$ nanoparticles sol prepared in step 4); the system is stirred for 3 to 24 hours to obtain the surface-treated $M^0$ nanoparticles sol. The content of the surface treatment agent in the $M^0$ nanoparticles sol is from 0.001 g/mL to 0.1 g/mL.

Figure 1:
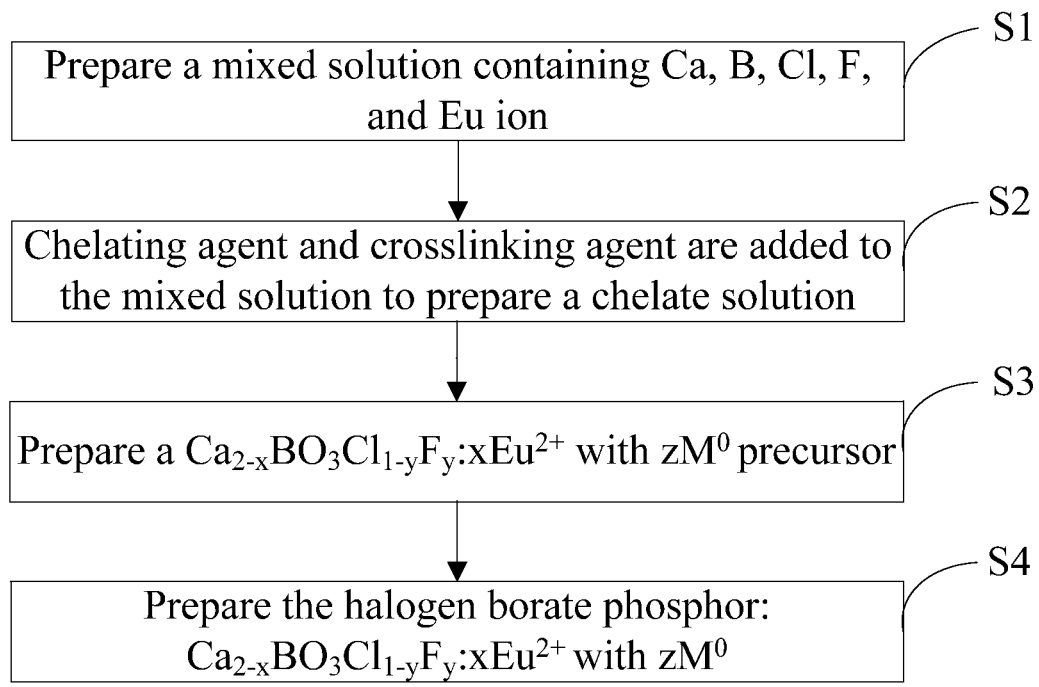
FIG. 1 is a flowchart of a method for preparing a halogen borate phosphor according to an embodiment of the present disclosure.

Referring to FIG. 1, a method of preparing the halogen borate phosphor includes the following steps:

Step S1, calcium source compound, boron source compound, chlorine source compound, fluorine source compound, and europium source compound are weighed and dissolved in water according to a composition of a formula of $Ca_{2-x}BO_3Cl_{1-y}F_y:xEu^{2+}$, with $zM^0$ to prepare a mixed solution, wherein $0.001 \le x \le 0.1$, $0 \le y \le 0.2$.

Step S2, chelating agent and crosslinking agent are added successively to the mixed solution obtained in the step S2 to prepare a chelate solution.

Step S3, the surface-treated nano-particle sol of $M^0$ is added to the chelate solution prepared in step S2, the system is stirred and heated in a water bath, dried to obtain a precursor, wherein $M^0$ represents metal nano-particles selected from the group consisting of Ag, Au, Pt, Pd and Cu.

Step S4, the precursor obtained in step S3 is pre-sintered, cooled, grinded, and then calcined in a reducing atmosphere (such as a mixed gas atmosphere consisting of $N_2$ and $H_2$ with a volume ratio of 95:5, or an atmosphere formed by carbon monoxide or hydrogen), cooled, grinded again to obtain the halogen borate phosphor represented by the following general formula: $Ca_{2-x}BO_3Cl_{1-y}F_y:xEu^{2+}$, with $zM^0$.

In step S1 of the method, the calcium source compound is calcium nitrate, calcium chloride, or calcium fluoride; the boron source compound is boric acid or tributyl borate; the chlorine source compound is calcium chloride or ammonium chloride; the fluorine source compound is calcium fluoride or ammonium fluoride; the europium source compound is europium nitrate, europium chloride, fluoride, or europium.

In step S2 of the method, the chelating agent is citric acid, and a molar ratio of the chelating agent to the total metal ions (including Ca ion and Eu ion) in the mixed solution is 1:1 to 3:1; the crosslinking agent is polyethylene glycol with a molecular weight of 10,000, and a molar ratio of the crosslinking agent to the total metal ions in the mixed solution is 0.5% to 1%.

In step S3 of the method, the amount of the surface-treated nano-particle sol of $M^0$ is 0 to 0.01 time of the amount of phosphor (calculated according to the z value of the general formula: $Ca_{2-x}BO_3Cl_{1-y}F_y:xEu^{2+}$, with $zM^0$). The process of stirring and heating in a water bath includes: stirring and heating in a 70° C. to 90° C. water bath for 2 hours to 6 hours; a temperature of the drying process is 80° C. to 150° C.

In step S4 of the method, the process of pre-sintering includes: pre-sintering at a temperature of 500° C. to 800° C. for 2 hours to 7 hours; the process of calcining comprises: calcining the precursor at a temperature of 800° C. to 1200° C. for 2 hours to 6 hours.

The innovation of the present invention is that: since metal nanoparticles are doped in the luminescent material, the luminous intensity of the luminescent material is increased by the surface plasmon resonance generated by the surface of the metal particles. The surface plasmon (SP) is a type of a wave spreading along the interface between metal and dielectric, and the amplitude exponentially decay as the distance away from the interface increases. When the metal surface structure is changed, the nature, dispersion relation, excitation mode, and coupling effects of surface plasmon polaritons (SPPs) will change significantly. The electromagnetic fields caused by the SPPs, not only can restrain the spread of light waves in the subwavelength structure, but also can generate and manipulate the electromagnetic radiation from the light frequency to the microwave band, thus active manipulation of light propagation is achieved, and to increase the optical density of states of the luminescent materials and enhances spontaneous emission rate. In addition, by using the surface plasmon coupling effect, the internal quantum efficiency of the luminescent material can be greatly improved, thus enhancing the emission intensity of the material.

The preferable embodiment will further be described below with reference to specific examples.

In the following examples, the molecular weight of the polyethylene glycol is 10000.

Example 1

This example discloses a phosphor represented by the formula of $Ca_{1.999}BO_3Cl:0.001Eu^{2+}$, with $1\times10^{-3}$Pt.

Preparation of a Pt Nanoparticles Sol 5.18 mg of chloroplatinic acid ($H_2PtCl_6 \cdot 6H_2O$) was weighed and dissolved in 17 mL of deionized water. After the chloroplatinic acid is completely dissolved, 8.0 mg of sodium citrate and 12.0 mg of sodium dodecyl sulfate were weighed and dissolved into the chloroplatinic acid solution under magnetic stirring. 0.38 mg of sodium borohydride was dissolved in 10 mL of deionized water to obtain 10 mL of sodium borohydride aqueous solution with a concentration of $1\times10^{-3}$ mol/L, meanwhile 10 mL of hydrazine hydrate solution with a concentration of $1\times10^{-2}$ mol/L was prepared. Under a condition of magnetic stirring, 0.4 mL sodium borohydride solution was added dropwise to the chloroplatinic acid aqueous solution, the mixture was stirred for 5 min, and 2.6 mL of $1\times10^{-2}$ mol/L hydrazine hydrate solution was then added dropwise to chloroplatinic acid solution, the reaction was continued for 40 min, and 20 mL of Pt nanoparticles sol with a Pt content of $5\times10^{-4}$ mol/L was obtained. Next, 2.0 g of PVP was added to the Pt nanoparticles sol, magnetic stirred for 12 h to obtain the surface treated Pt nanoparticles.

Preparation of $Ca_{1.999}BO_3Cl:0.001Eu^{2+}$, with $1\times10^{-3}Pt$ 0.01999 mol of $Ca(NO_3)_2$ solution, 0.01 mol of $H_3BO_3$, 0.01 mol of $NH_4Cl$, $1\times10^{-5}$ mol of $Eu(NO_3)_3$ were measured and added to the beaker, 50 mL of deionized water was added, stirred to obtain a mixed solution. 4.2 g of citric acid and 1 g of PEG (polyethylene glycol) were added to the mixed solution with stirring. 20 mL of surface treated Pt particles solution was measured and heated in a 70° C. water bath for 6 hours to obtain a sol. The sol was dried at a temperature of 80° C. to obtain a precursor. The precursor was placed in a high temperature furnace and pre-calcined at 500° C. for 7 h, cooled to room temperature, then grinded. Next, it was placed in an 800° C. box-type high temperature furnace or in a tube furnace to calcine for 6 hours, natural cooled, grinded, and a phosphor of $Ca_{1.999}BO_3Cl:0.001Eu^{2+}$, with $1\times10^{-3}Pt$ was obtained.

Example 2

This example discloses a phosphor represented by the formula of $Ca_{1.99}BO_3Cl_{0.95}F_{0.05}:0.01Eu^{2+}$, with $5\times10^{-4}Au$.

Preparation of an Au Nanoparticles Sol 4.12 mg of gold chloride acid $(AuCl_3 \cdot HCl \cdot 4H_2O)$ was weighed and dissolved in 8.4 mL of deionized water. After the gold chloride acid is completely dissolved, 14 mg of sodium citrate and 6 mg of cetyl trimethyl ammonium bromide were weighed and dissolved into the chloroplatinic acid solution under magnetic stirring. 1.9 mg of sodium borohydride and 17.6 g of ascorbic acid were dissolved in 10 mL of deionized water respectively to obtain 10 mL of sodium borohydride aqueous solution with a concentration of $5\times10^{-3}$ mol/L and 10 mL of ascorbic acid aqueous solution with a concentration of $1\times10^{-2}$ mol/L. Under a condition of magnetic stirring, 0.04 mL sodium borohydride solution was added dropwise to the gold chloride acid aqueous solution, the mixture was stirred for 5 min, and 1.56 mL of $1\times10^{-2}$ mol/L ascorbic acid aqueous solution was then added dropwise to gold chloride acid solution, the reaction was continued for 30 min, and 10 mL of Au nanoparticles sol with an Au content of $1\times10^{-3}$ mol/L was obtained. Next, 6 mL of Au nanoparticles sol was measured, and 0.006 g of PVP was added to the Au nanoparticles sol, magnetic stirred for 8 h to obtain the surface treated Au nanoparticles.

Preparation of $Ca_{1.99}BO_3Cl_{0.95}F_{0.05}:0.01Eu^{2+}$, with $5\times10^{-4}Au$:

0.0199 mol of $Ca(NO_3)_2$ solution, 0.01 mol of $H_3BO_3$, 0.0095 mol of $NH_4Cl$, 0.0005 mol of $NH_4F$, 0.0001 mol of $EuCl_3$ were measured and added to the beaker, 50 mL of deionized water was added, stirred to obtain a mixed solution. 12.6 g of citric acid and 1 g of PEG (polyethylene glycol) were added to the mixed solution with stirring. 5 mL of surface treated Au particles solution was measured and heated in a 80° C. water bath for 4 hours to obtain a sol. The sol was dried at a temperature of 120° C. to obtain a precursor. The precursor was placed in a high temperature furnace and pre-calcined at 800° C. for 2 h, cooled to room temperature, then grinded. Next, it was placed in a 1100° C. box-type high temperature furnace or in a tube furnace to calcine for 2 hours, natural cooled, grinded, and a phosphor of $Ca_{1.99}BO_3Cl_{0.95}F_{0.05}:0.01Eu^{2+}$, with $5\times10^{-4}Au$ was obtained.

Example 3

This example discloses a phosphor represented by the formula of $Ca_{1.98}BO_3Cl_{0.98}F_{0.02}:0.02Eu^{2+}$, with $5\times10^{-4}Ag$.

Preparation of an Ag Nanoparticles Sol 3.40 mg of silver nitrate $(AgNO_3)$ was weighed and dissolved in 18.4 mL of deionized water. After the silver nitrate is completely dissolved, 22 mg of sodium citrate and 20 mg of PVP were weighed and dissolved into the silver nitrate solution under magnetic stirring. 5.7 mg of sodium borohydride was dissolved in 10 mL of deionized water to obtain 10 mL of sodium borohydride aqueous solution with a concentration of $1.5\times10^{-2}$ mol/L. Under a condition of magnetic stirring, 1.6 mL of $1.5\times10^{-2}$ mol/L of sodium borohydride aqueous solution was added to the silver nitrate aqueous solution, the reaction was continued for 10 min, and 20 mL of Ag nanoparticles sol with an Ag content of $1\times10^{-3}$ mol/L was obtained. Next, 1 g of PVP was added to the Ag nanoparticles sol, magnetic stirred for 6 hours to obtain the surface treated Ag nanoparticles.

Preparation of $Ca_{1.98}BO_3Cl_{0.98}F_{0.02}:0.02Eu^{2+}$, with $5\times10^{-4}Ag$ 0.0148 mol of $Ca(NO_3)_2$ solution, 0.01 mol of $C_{12}H_{27}BO_3$ (tributyl borate), 0.0049 mol of $CaCl_2$, 0.0001 mol of $CaF_2$, 0.0002 mol of $Eu(NO_3)_3$ were measured and added to the beaker, 50 mL of deionized water was added, stirred to obtain a mixed solution. 8.4 g of citric acid and 1 g of PEG (polyethylene glycol) were added to the mixed solution with stirring. 5 mL of surface treated Ag particles solution was measured and heated in an 80° C. water bath for 4 hours to obtain a sol. The sol was dried at a temperature of 100° C. to obtain a precursor. The precursor was placed in a high temperature furnace and pre-calcined at 600° C. for 5 h, cooled to room temperature, then grinded. Next, it was placed in a 900° C. box-type high temperature furnace or in a tube furnace to calcine for 4 hours, natural cooled, grinded, and a phosphor of $Ca_{1.98}BO_3Cl_{0.98}F_{0.02}:0.02Eu^{2+}$, with $5\times10^{-4}Ag$ was obtained.

In order to verify the influence to the luminescent properties by the additional metal, a comparative example, which was similar to the present embodiment but without doping metal, was implemented.

Comparative Example 1

Comparative to Example 3

Preparation of Phosphor $Ca_{1.98}BO_3Cl_{0.98}F_{0.02}$:
$0.02Eu^{2+}$ 0.0148 mol of $Ca(NO_3)_2$ solution, 0.01 mol of $C_{12}H_{27}BO_3$ (tributyl borate), 0.0049 mol of $CaCl_2$, 0.0001 mol of $CaF_2$, 0.0002 mol of $Eu(NO_3)_3$ were measured and added to the beaker, 50 mL of deionized water was added, stirred to obtain a mixed solution. 8.4 g of citric acid and 1 g of PEG (polyethylene glycol) were added to the mixed solution with stirring. The solution was heated in an 80° C. water bath for 4 hours to obtain a sol. The sol was dried at a temperature of 100° C. to obtain a precursor. The precursor was placed in a high temperature furnace and pre-calcined at 600° C. for 5 h, cooled to room temperature, then grinded. Next, it was placed in a 900° C. box-type high temperature furnace or in a tube furnace to calcine for 4 hours, natural cooled, grinded, and a phosphor of $Ca_{1.98}BO_3Cl_{0.98}F_{0.02}$:$0.02Eu^{2+}$ was obtained.

Figure 2:
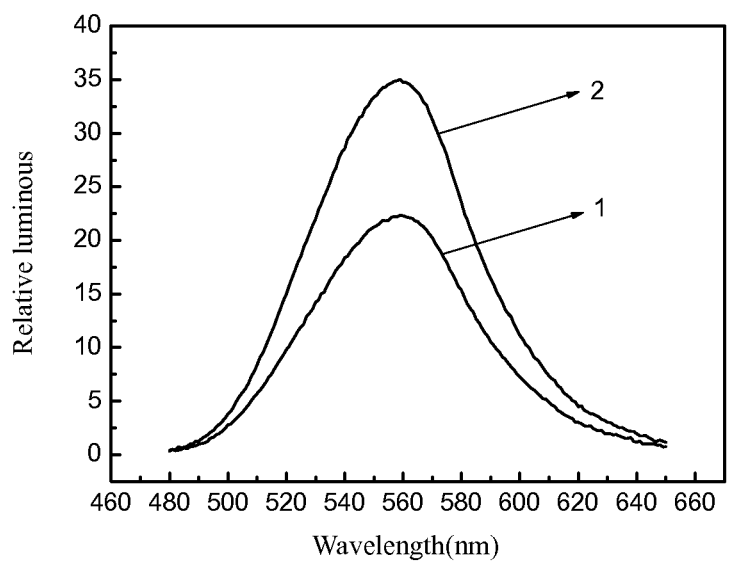
FIG. 2 shows a comparison of emission spectrum between the sample prepared according to Example 3 comparing with the sample prepared according to Comparative Example 1 excited by blue ray at 460 nm; where curve 1 denotes an emission spectrum of phosphor $Ca_{1.98}BO_3Cl_{0.95}F_{0.05}$:$0.02Eu^{2+}$ without metal nano-particles prepared according to Comparative Example 1; curve 2 denotes an emission spectrum of phosphor $Ca_{1.98}BO_3Cl_{0.95}F_{0.05}:0.02Eu^{2+}$, with $5\times10^{-4}$Au prepared according to Example 3.

FIG. 2 shows a comparison of emission spectrum between the sample prepared according to Example 3 comparing with the sample prepared according to Comparative Example 1 excited by blue ray at 460 nm; where curve 1 denotes an emission spectrum of phosphor $Ca_{1.98}BO_3Cl_{0.95}F_{0.05}$: $0.02Eu^{2+}$ without doping metal nano-particles prepared according to Comparative Example 1; curve 2 denotes an emission spectrum of phosphor $Ca_{1.98}BO_3Cl_{0.95}F_{0.05}$: $0.02Eu^{2+}$, with $5\times10^{-4}Au$ prepared according to Example 3. It can be seen from FIG. 2 that, when the metal nano-particles is doped, the emission intensity of the sample can be increased by above 50%.

Figure 3:
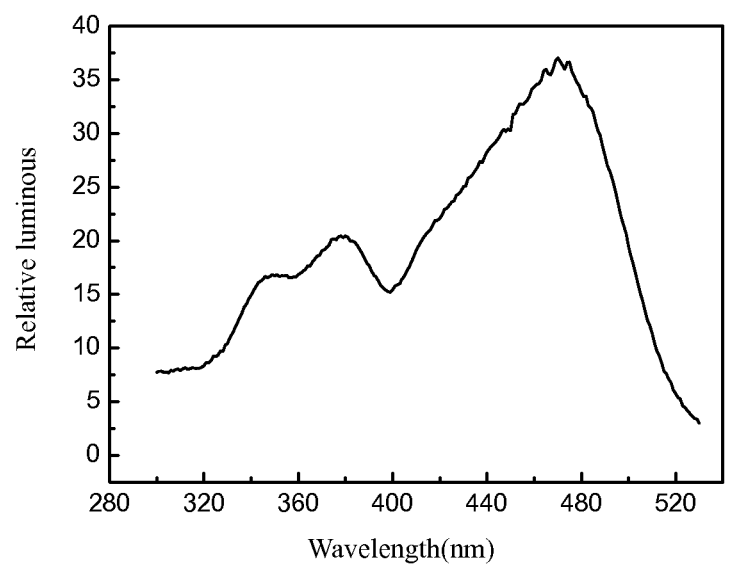
FIG. 3 shows an excitation spectrum of the sample prepared according to Example 3 of the present invention (monitoring at 558 nm emission).

FIG. 3 shows an excitation spectrum of the sample prepared according to Example 3 of the present invention (monitoring at 558 nm emission). It can be seen from FIG. 3 that, the sample prepared by the present invention have a strong absorption in the range of 400 to 500 nm, thus it is very suitable for the excitation of a blue LED chip, and it can be applied to white light LED.

Example 4

This example discloses a phosphor represented by the formula of $Ca_{1.95}BO_3Cl_{0.9}F_{0.1}$:$0.05Eu^{2+}$, with $1\times10^{-3}Ag$.

Preparation of an Ag Nanoparticles Sol 3.40 mg of silver nitrate ($AgNO_3$) was weighed and dissolved in 18.4 mL of deionized water. After the silver nitrate is completely dissolved, 22 mg of sodium citrate and 20 mg of PVP were weighed and dissolved into the silver nitrate solution under magnetic stirring. 5.7 mg of sodium borohydride was dissolved in 10 mL of deionized water to obtain 10 mL of sodium borohydride aqueous solution with a concentration of $1.5\times10^{-2}$ mol/L. Under a condition of magnetic stirring, 1.6 mL of $1.5\times10^{-2}$ mol/L of sodium borohydride aqueous solution was added to the silver nitrate aqueous solution, the reaction was continued for 10 min, and 20 mL of Ag nanoparticles sol with an Ag content of $1\times10^{-3}$ mol/L was obtained. Next, 1 g of PVP was added to the Ag nanoparticles sol, magnetic stirred for 6 hours to obtain the surface treated Ag nanoparticles.

Preparation of $Ca_{1.95}BO_3Cl_{0.9}F_{0.1}$:$0.05Eu^{2+}$, with $1\times10^{-3}Ag$ 0.0195 mol of $Ca(NO_3)_2$ solution, 0.01 mol of $C_{12}H_{27}BO_3$ (tributyl borate), 0.009 mol of $NH_4Cl$, 0.001 mol of $NH_4F$, 0.0005 mol of $Eu(NO_3)_3$ were measured and added to the beaker, 50 mL of deionized water was added, stirred to obtain a mixed solution. 9.6 g of citric acid and 1.5 g of PEG (polyethylene glycol) were added to the mixed solution with stirring. 10 mL of surface treated Ag particles solution was measured and heated in an 90° C. water bath for 2 hours to obtain a sol. The sol was dried at a temperature of 120° C. to obtain a precursor. The precursor was placed in a high temperature furnace and pre-calcined at 600° C. for 3 h, cooled to room temperature, then grinded. Next, it was placed in a 1200° C. box-type high temperature furnace or in a tube furnace to calcine for 2 hours, natural cooled, grinded, and a phosphor of $Ca_{1.95}BO_3Cl_{0.9}F_{0.1}$:$0.05Eu^{2+}$, with $1\times10^{-3}Ag$ was obtained.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A halogen borate phosphor, represented by the following general formula:

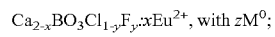

$Ca_{2-x}BO_3Cl_{1-y}F_y$:$xEu^{2+}$, with $zM^0$;

wherein $M^0$ represents metal nano-particles selected from the group consisting of Ag, Au, Pt, Pd and Cu; $0.001 \le x \le 0.1$, $0 \le y \le 0.2$, $0 < z \le 0.01$.

2. The halogen borate phosphor according to claim 1, wherein $1\times10^{-4} \le z \le 1\times10^{-3}$.

3. A method of preparing a halogen borate phosphor, comprising the following steps:

step S1, weighing and dissolving calcium source compound, boron source compound, chlorine source compound, fluorine source compound, and europium source compound in water according to a composition of a formula of $Ca_{2-x}BO_3Cl_{1-y}F_y$:$xEu^{2+}$, with $zM^0$ to prepare a mixed solution, wherein $0.001 \le x \le 0.1$, $0 \le y \le 0.2$;

step S2, adding chelating agent and crosslinking agent successively to the mixed solution obtained in the step S1 to prepare a chelate solution;

step S3, adding surface-treated nano-particle sol of $M^0$ to the chelate solution prepared in step S2, stirring and heating in a water bath, drying to obtain a precursor, wherein $M^0$ represents metal nano-particles selected from the group consisting of Ag, Au, Pt, Pd and Cu; and step S4, pre-sintering, cooling, grinding, and then calcining the precursor obtained in step S3 in a reducing atmosphere, cooling, grinding to obtain the halogen borate phosphor represented by the following general formula: $Ca_{2-x}BO_3Cl_{1-y}F_y$:$xEu^{2+}$, with $zM^0$.

4. The method according to claim 3, wherein in step S1, the calcium source compound is calcium nitrate, calcium chloride, or calcium fluoride; the boron source compound is boric acid or tributyl borate; the chlorine source compound is calcium chloride or ammonium chloride; the fluorine source compound is calcium fluoride or ammonium fluoride; the europium source compound is europium nitrate, europium chloride, fluoride, or europium.

5. The method according to claim 3, wherein in step S2, the chelating agent is citric acid, and a molar ratio of the chelating agent to the total metal ions in the mixed solution is 1:1 to 3:1; the crosslinking agent is polyethylene glycol with a molecular weight of 10,000, and a molar ratio of the crosslinking agent to the total metal ions in the mixed solution is 0.5% to 1%.

6. The method according to claim 3, wherein in step S3, the surface-treated nano-particle sol of $M^0$ is prepared according to the following steps:

step S31, weighing and dissolving an $M^0$ source compound in water to prepare and dilute a solution with a molar concentration of $M^0$ ion of $1\times10^{-4}$ mol/L to $1\times10^{-2}$ mol/L; wherein $M^0$ represents metal nano-particles selected from the group consisting of Ag, Au, Pt, Pd and Cu;

step S32, adding an additive and a reducing agent solution successively to the solution prepared in step S31, stirring and obtaining an $M^0$ nanoparticles sol; and step S33, adding a surface treatment agent to the $M^0$ nanoparticles sol obtained in step S32, stirring to obtain the surface-treated $M^0$ nanoparticles sol.

7. The preparation method according to claim 6, wherein in step S32, the additive is at least one selected from the group consisting of polyvinylpyrrolidone, sodium citrate, cetyl trimethyl ammonium bromide, sodium lauryl sulfate, and sodium dodecyl sulfate; and the concentration of the additive in the $M^0$ nanoparticles sol is from $1.5\times10^{-4}$ g/mL to $2.1\times10^{-3}$ g/mL; a molar concentration of the reducing agent solution is from $1\times10^{-3}$ mol/L to $1\times10^{-2}$ mol/L; a reducing agent in the reducing agent solution is at least one selected from the group consisting of hydrazine, ascorbic acid, and sodium borohydride; a molar ratio of the reducing agent and the $M^0$ ion is 1.2:1 to 4.8:1.

8. The preparation method according to claim 6, wherein in step S33, the surface treatment agent is polyvinylpyrrolidone; the content of the surface treatment agent in the $M^0$ nanoparticles sol is from 0.001 g/mL to 0.1 g/mL.

9. The preparation method according to claim 3, wherein in step S3, the process of stirring and heating in a water bath comprises: stirring and heating in a 70° C. to 90° C. water bath for 2 hours to 6 hours; a temperature of the drying process is 80° C. to 150° C.

10. The preparation method according to claim 3, wherein in step S4, the process of pre-sintering comprises: pre-sintering at a temperature of 500° C. to 800° C. for 2 hours to 7 hours; the process of calcining comprises: calcining the precursor at a temperature of 800° C. to 1200° C. for 2 hours to 6 hours.

* * * * *